United States Patent

Elkind

(10) Patent No.: US 8,815,209 B2
(45) Date of Patent: Aug. 26, 2014

(54) GENERATING HYDROGEN FUEL

(75) Inventor: Jerry Elkind, Dallas, TX (US)

(73) Assignee: Stellar Generation, LLC, Dallas, TX (US)

( * ) Notice: Subject to any disclaimer, the term of this patent is extended or adjusted under 35 U.S.C. 154(b) by 596 days.

(21) Appl. No.: 12/875,648

(22) Filed: Sep. 3, 2010

(65) Prior Publication Data

US 2011/0052451 A1 Mar. 3, 2011

Related U.S. Application Data

(60) Provisional application No. 61/239,707, filed on Sep. 3, 2009.

(51) Int. Cl.
 *B01J 7/00* (2006.01)
 *C01B 3/00* (2006.01)
 *C01B 3/02* (2006.01)
 *C01B 3/04* (2006.01)
 *C01B 3/50* (2006.01)

(52) U.S. Cl.
 CPC ......... *C01B 3/042* (2013.01); *C01B 2203/0465* (2013.01); *C01B 3/503* (2013.01); *C01B 2203/0405* (2013.01); *Y02E 60/364* (2013.01)
 USPC ............. 423/658.2; 48/61; 422/162; 423/644

(58) Field of Classification Search
 None
 See application file for complete search history.

(56) References Cited

U.S. PATENT DOCUMENTS

| 2,170,329 | A * | 8/1939 | Hoke | 451/401 |
| 7,384,619 | B2 * | 6/2008 | Bar-Gadda | 423/579 |
| 2001/0013227 | A1 * | 8/2001 | Lang et al. | 62/374 |
| 2002/0100836 | A1 * | 8/2002 | Hunt | 244/50 |
| 2002/0117124 | A1 * | 8/2002 | McMaster et al. | 123/3 |
| 2002/0157403 | A1 * | 10/2002 | Giacobbe et al. | 62/64 |
| 2006/0048808 | A1 * | 3/2006 | Ruckman et al. | 136/206 |
| 2007/0292341 | A1 * | 12/2007 | Kitada | 423/644 |

* cited by examiner

*Primary Examiner* — Melvin C Mayes
*Assistant Examiner* — Colin W Slifka
(74) *Attorney, Agent, or Firm* — Fish & Richardson P.C.

(57) ABSTRACT

The present disclosure is directed to generating hydrogen using thermal energy. In some implementations, a method includes concentrating solar energy on an absorption element to heat the absorption element to about 2,000° C. or greater. The absorption element is in thermal contact with a reservoir of water. The water is at a pressure of, for example, approximately 760 Torr or less, and at least a portion of the water disassociates based on heat from the absorption element. The hydrogen and the oxygen are rapidly cooled to substantially avoid recombination. After cooling, the hydrogen gas and oxygen gas are pressurized and then separated using a size-selective membrane.

17 Claims, 9 Drawing Sheets

GENERATING HYDROGEN FUEL

CLAIM OF PRIORITY

This application claims priority under 35 USC §119(e) to U.S. Provisional Application No. 61/239,707, filed Sep. 3, 2009, the entire disclosure of which is incorporated herein by reference.

TECHNICAL FIELD

This invention relates to natural energy and, more particularly, to generating hydrogen fuel.

BACKGROUND

On-going geo-political concerns, concerns for global warming, and rising oil prices are fueling the push for renewable energy sources such as wind and solar power. Today, the majority of the electricity generated in the United States is produced by burning fossil fuels, such as coal, natural gas, and petroleum, nuclear power and hydroelectric power. Energy produced from alternative energy sources, such as wind and solar power, account for a small percentage of the total electricity produced in the United States. Our reliance on fossil fuels and nuclear power has several drawbacks. While fossil fuels are comparatively inexpensive, there is only a limited supply of fossil fuels, which will eventually be depleted if alternative energy sources are not found. Further, the burning of fossil fuels to produce electricity emits greenhouse gases that contribute to global warming. The main problem with nuclear power is how to dispose of hazardous waste.

Solar energy and wind power are promising alternative energy sources that can reduce reliance on fossil fuels for generating electricity. Solar energy and wind power are renewable resources so there is no concern about future depletion of these resources. Further, the generation of electricity from solar energy and wind power does not emit greenhouse gases and is therefore considered more environmentally friendly. Also, generation of electricity from renewable energy sources does not generate hazardous by-products that need to be disposed of.

SUMMARY

The present disclosure is directed to generating hydrogen using thermal energy. In some implementations, a method includes concentrating solar energy on an absorption element to heat the absorption element to about 2,000° C. or greater. The absorption element is in thermal contact with a reservoir of water. The water is at a low pressure of, for example, approximately 760 Torr or less, and at least a portion of the water disassociates based on heat from the absorption element. The hydrogen and the oxygen are rapidly cooled to substantially avoid recombination. After cooling, the hydrogen gas and oxygen gas are pressurized and then separated using, for example, a size-selective membrane.

Some implementations may include one or more of the following advantages. Using sunlight as heat allows for a very efficient use of sunlight as opposed to photolytic processes which are only sensitive to specific portions of the sun's spectrum. Using water as the feed stock instead of natural gas or methane is advantageous because substantially no $CO_2$ is produced, which is a greenhouse gas and contributes to global warming. Using highly concentrated light allows for the size of the processing equipment to be reduced because light is focused to a small area. In comparison, photovoltaics typically require the sunlight to be collected by expensive solar cells instead of relatively cheap reflectors. Using a gentle piston approach to both evacuate the decomposition unit and compress the cooled gases may allow conventional separation materials to be used rather than those underdevelopment to do separations at decomposition temperatures. These new materials underdevelopment may never be made to work and are more expensive than existing polymer membranes. Hydrogen as a fuel essentially has no environmental impact as opposed to gasoline, for example, which emits CO2, smog components, and includes potent carcinogens. The disclosed process for producing hydrogen may be more economical than current approaches because some implementations disclosed below can use simple, existing technology (e.g., ceramics, polymer membranes), inexpensive feed stock—water, a free power source—sunlight, and/or steps for harvesting said sunlight which is cheap (e.g., large plastic optics). In addition, the disclosed process may be scalable to small systems without needing to be burdened with large, expensive compressors and/or vast areas of expensive silicon. In these implementations, that means it will be economical even when it is configured as a small system because the hydrogen production can be moved to point of use locations. In these instances, these implementations can have a huge advantage as the designs eliminate substantial transportation and/or storage issues that come with a large centralized hydrogen production facility.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
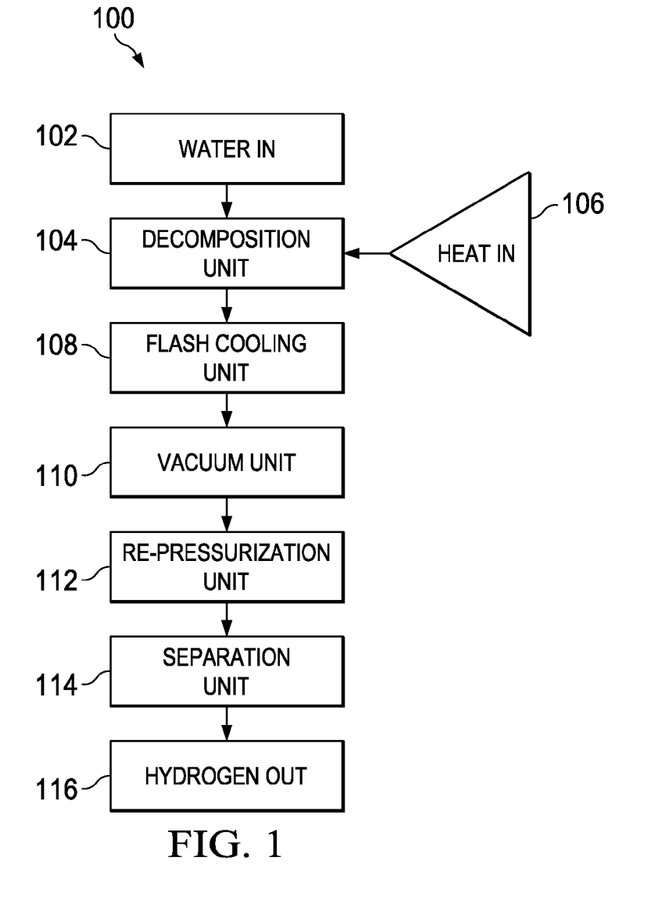
FIG. 1 is a block diagram illustrating an example hydrogen system in accordance with some implementations of the present disclosure.

FIG. 1 is a block diagram illustrating an example hydrogen system 100 for generating hydrogen using thermal energy. For example, the system 100 may focus solar energy to generate sufficient heat to disassociate water into hydrogen and oxygen. In other words, the thermal energy that can break apart or otherwise disassociate water molecules can be generated, in some implementations, by concentrating sunlight. For example, the system 100 may concentrate sunlight in the range of about 2,000-10,000 suns (e.g., 5,000). In some implementations, the system 100 may include a plurality of concentrators such as an array of mirrors or lenses to generate sufficient solar energy to heat one or more elements. In other words, the system 100 may convert at least a portion of incident solar energy to thermal energy sufficient to disassociate water. For example, the system 100 may concentrate solar energy on material that absorbs at least a portion of the incident light (e.g., visible, ultraviolet) and generate sufficient thermal energy to disassociate water. The system 100 may transfer the thermal energy to water through conduction, convection, radiation, and/or mass transfer. Regardless, the system 100 may sufficiently heat the water to high temperatures (e.g., about 2,000° C.) that disassociate water.

In the illustrated implementations, the system 100 includes a water reservoir 102, a decomposition unit 104, a heat source 106, a flash cooling unit 108, a vacuum unit 110, a re-pressurization unit 112, a separation unit 114, and a collection unit 116. The water reservoir 102 provides water or water in any suitable carrier to the system 100 for disassociation. In some implementations, the water is de-ionized. The water reservoir 102 may include a filtration system (e.g., membrane) to remove contaminants such as metal. In addition, the water reservoir 102 may heat the water prior to feeding the decomposition unit 104. For example, the reservoir 102 may include a heat exchanger to recover heat from the flash cooling unit 108. Regardless, the water reservoir 102 provides the water stream to the decomposition unit 104 which is heated to, for example, about 2000° C. or greater. Disassociation of the water molecule is accomplished by direct thermal decomposition at high temperatures as illustrated in Equation 1.

$$2H_2O(g) + \text{heat} \longleftrightarrow 2H_2(g) + O_2(g) \qquad \text{Eqn. 1}$$

It is well known in the art that when this reaction is in equilibrium, the fraction of water that is in a disassociated form is a function of several parameters such as temperature and pressure. In some implementations, the decomposition unit 104 may generate or otherwise provide temperatures in excess of about 2000° C. in order to allow for appreciable disassociation of water at low pressure. The decomposition unit 104 may increase the amount of hydrogen and oxygen decomposition products by maintaining the heated water at a pressure below atmospheric pressure. For example, the decomposition unit 104 may disassociate the water at a pressure between about 1 Torr and about 500 Torr (e.g., about 5 Torr, about 20 Torr). In some implementations, the decomposition unit 104 may decompose four times as much water at 7 Torr vs. 760 Torr when operating at about 2200° C.

In order to be able to achieve the very high temperatures for disassociation, and to do so in the presence of very reactive materials such as superheated oxygen, the decomposition unit 104 may include materials that have high melting points and/or are resistant to oxidation. In some implementations, the decomposition unit 104 may include an oxide-based ceramics (e.g., zirconia, alumina, magnesia and/or hafnia). In addition to being unreactive with hydrogen and oxygen at high temperatures and having a very high melting point, the material may also have low thermal conductivity (e.g., about 2 Watts/Meter/° K) to minimize or otherwise reduce the loss of system heat from a reaction zone and/or simplify the system design. The reaction zone may be a volume in the decomposition unit 104 where decomposition of the water predominately occurs (e.g., 80%, 90%). In some implementations, at least portions of the decomposition unit 104 may be resistant to thermal shock. In the case that the decomposition unit 104 receives thermal energy from concentrated sunlight, the decomposition unit 104 may include material that efficiently absorbs visible light (e.g., light with wavelengths below about 900 nanometers), which is the dominant component in terrestrial sunlight. In the event that the portion of the decomposition unit 104 that thermally disassociates the water is not a good absorber of visible light (e.g., light with wavelengths below about 900 nanometers), the decomposition unit 104 may include a second material adjacent the first material such that the second material absorbs the sunlight and transfers the thermal energy to the first material. For example, the decomposition unit 104 may include a coating of the second material (e.g., tube) that is adjacent and covers the outside of the first material. In these instances, the outer coating may transfer thermal energy to the second material primarily through conduction. The second material may, for example, include graphite and/or silicon carbide, which are excellent absorbers of visible light and are both stable at very high temperatures such as about 2000° C. or greater.

While carbon-containing materials (e.g., silicon carbide, graphite) would oxidize in the oxygen-rich reactive environment after disassociation, such materials as an outside coating that is not in contact with the hot water or hot decomposition products may effectively help transmit energy into the decomposition unit 104 that would have been otherwise reflected or transmitted by the first material. The decomposition unit 104 may increase the achievable temperature for a given sunlight concentration factor if the coating or selective surface chosen is a strong absorber of visible light but a poor emitter of infrared (IR) light. While the decomposition unit 104 has been described as including one or more materials, the decomposition unit 104 may include the same, none, or different materials and/or with different optical properties without departing from the scope of the disclosure. Selective surfaces may include a high temperature material that effectively reflects infrared light. For example, the decomposition unit 104 may include a ceramic element that forms a conduit and tungsten disposed between an outer surface of the ceramic element and an inner surface of a top layer of a high temperature material (e.g., $Cr_2O_3$) that effectively absorbs visible light.

In some implementations, the heat source 106 may include solar concentrators that concentrate incident sunlight. For example, the heat source 106 may concentrate incident sunlight to 2,000-10,000 suns. In general, sunlight concentrators may include parabolic mirrors, Fresnel lenses, and/or other elements that can gather and/or concentrate a large area of sunlight to a small area. In some implementations, the heat source 106 can include one or more parabolic mirrors to focus sunlight on the decomposition unit 104. The heat source 106 may include a solar furnace that uses an array of mirrors to focus sunlight onto a focal point in order to generate high temperatures. The heat source 106 may include other methods of heating the water without departing from the scope of this disclosure such as resistive heating, where electricity generated by renewable energy sources or otherwise is used to generate the heat, burning coal or other suitable fuels, nuclear reactor, where larges mounts of heat are produced, and/or others.

After disassociation, the heated gas containing decomposition products, as well as undecomposed water vapor, is passed to the flash cooling unit 108 to quickly cool the gas to substantially prevent recombination of the hydrogen and oxygen gases. For example, the decomposition products may quickly exit the reaction zone and pass into the flash cooling unit 108. In some implementations, the decomposition products may between the reaction zone and the flash cooling unit 108 in tens of milliseconds (e.g., 1-30 milliseconds). By rapidly transferring the decomposition products, the system 100 may eliminate, minimize or reduce recombination of the hydrogen and the oxygen products. In some implementations, the flash cooling unit 108 can bring the decomposition products down below approximately 400° C. in approximately between 1 and 100 milliseconds. As discussed below, the flash cooling unit 108 may include a solid, liquid, and/or gas at a temperature sufficiently cool to rapidly reduce the temperature of the decomposition products within a certain period of time. For example, the flash cooling unit 108 may include a temperature that cools the decomposition products to below approximately 400° C. in, for example, tens of milliseconds.

Because a pressure gradient may be used to move the gases from the water source 102 through the decomposition unit 104 and into the flash cooling unit 108, and because it is useful to establish a low pressure condition in the decomposition unit 104, a simple vacuum pump 110 may be disposed at the exit of the flash cooling unit 108 to drive the gas flow as well as set the low pressure condition in the decomposition unit 104.

The vacuum unit 110 then feeds the gas to the separation unit 114 for separating the hydrogen gas from the oxygen gas. The separation unit 114 may use one or more mechanisms for separating the different gases such as size selection (e.g., membrane), condensation point, and/or others.

In some implementations, the separation unit 114 may include a plurality of separation stages to purify the hydrogen to, for example, approximately 99%. In some instances, the separation unit 114 includes a palladium-based membrane, which has extremely high selectivity to further increase the purity of the hydrogen. Other methods such as pressure swing absorption may be employed to separate the oxygen from the hydrogen without departing from the scope of this disclosure. Alternatively or in combination, the separation unit 114 may include other methods of gas separation such as Pressure Swing Absorption (PSA), cryogenic methods, and/or others. Cryogenic methods are based on differences in the gases' boiling points. In the case where a high pressure is useful on the inlet of the separation unit 114, a re-pressurization unit 112 may be utilized to raise the pressure of the gasses to be separated.

Figure 2A:
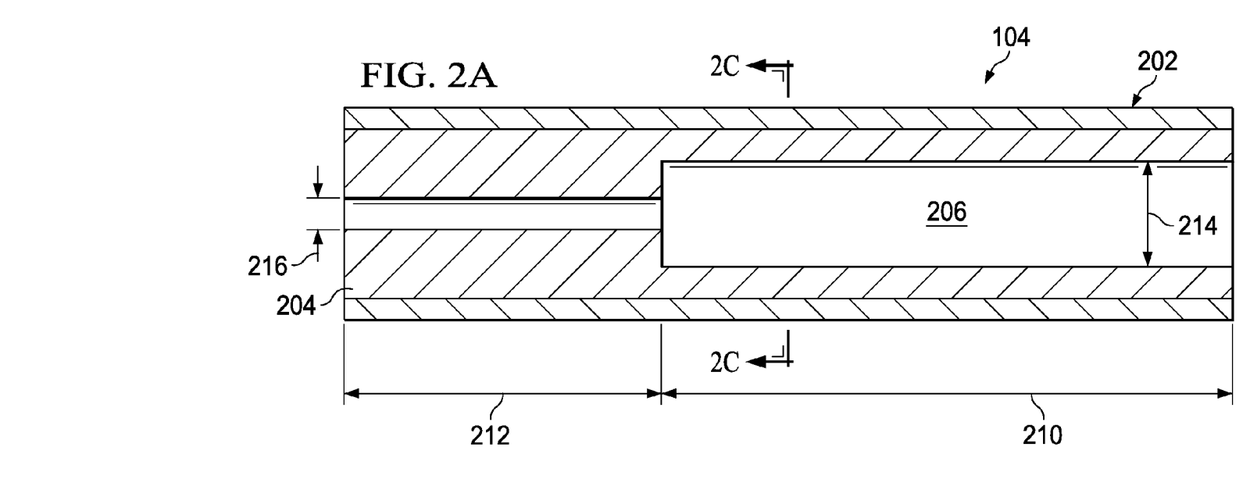
FIGS. 2A, 2B and 2C illustrate an example decomposition unit of FIG. 1.
Figure 2B:
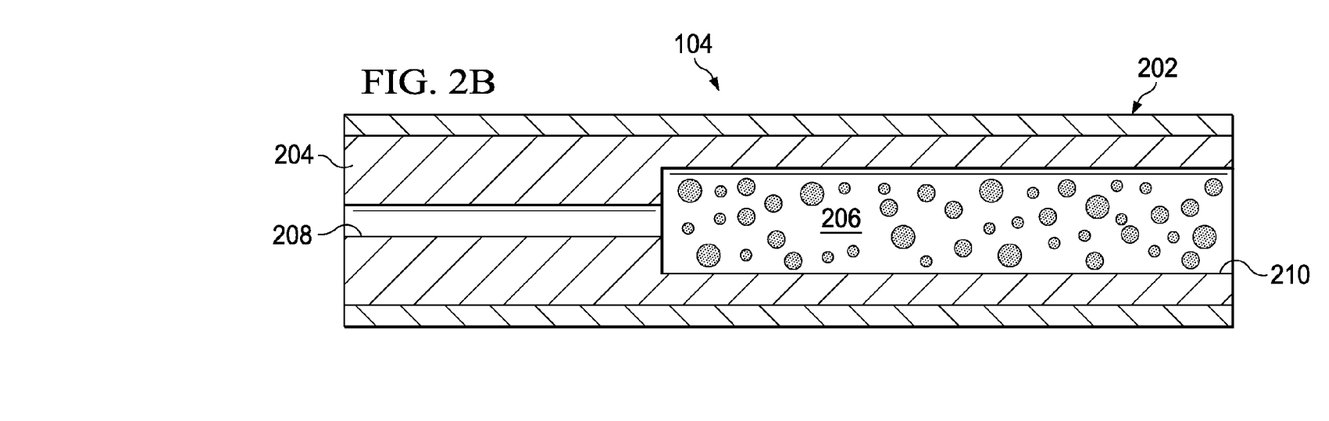
Figure 2C:
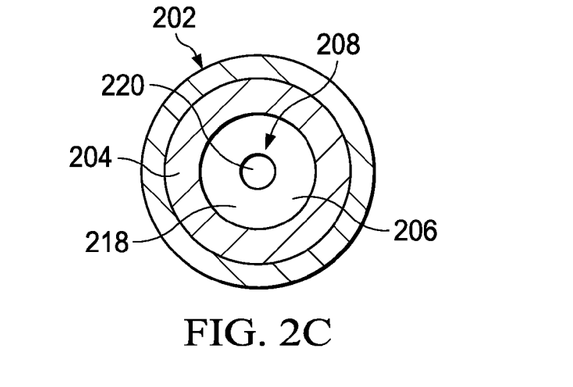

FIGS. 2A-C illustrate an example implementation of the decomposition unit 104 of FIG. 1. The decomposition unit 104 includes separate materials for (1) converting concentrated sunlight to thermal energy and (2) thermally disassociating the water. In the illustrated implementation, the decomposition unit 104 includes light absorbing material 202 that absorbs concentrated sunlight to convert the light to thermal energy. In some instances, the absorbing material 202 transfers the heat to the high-temperature material 204 through conduction. Heat from the high-temperature material 204 thermally disassociates the water into hydrogen and oxygen gases. The decomposition unit 104 may be substantially surrounded with insulating material and/or perhaps an infrared reflective material to help contain re-radiated heat.

In addition, the decomposition unit 104 includes a wide bore 206 for receiving water and narrow bore 208 for ejecting the hot gases. In the illustrated implementation, the unit 104 includes a first length 210 that spans at least portion of the length of the wide bore 206 and a second length 212 that spans at least a portion of the length of the narrow bore 208. The length 210 may substantially define a dimension of a reaction zone where water decomposes due to thermal energy. As previously mentioned, the hot gases may be rapidly cooled to below 400° C. to reduce recombination to water. In some implementations, the decomposition unit 104 may rapidly eject the hot gas into the flash cooling unit 108. In the illustrated instance, the gases flow relatively slowly in the wider channel 206, and the narrower channel 208 may enable the hot decomposition products to exit rapidly. In some examples, the flow rate is proportional to the square of the tube inner diameter. The diameter of the narrower channel 208 may be, for example, 1 millimeter (mm) or less. In general, the length and width of the narrow channel 208 may be designed to allow gases to exit the decomposition unit at a particular flow rate in the prescribed time (e.g., approximately several ms).

Referring to FIG. 2B, the decomposition unit 104 unit may include a wide bore 206 with an increased surface area in the heated region to help insure that the incoming water vapor is sufficiently heated. In the illustrated implementation, the decomposition unit 104 includes granules 210 of a high temperature ceramic material to increase the surface area and increase heating efficiency. In some examples, the granules 210 may have high thermal conductivity. While not illustrated, the decomposition unit 104 may increase the surface area using ceramic foam that may have the ability to withstand high temperatures, be unreactive with water and the decomposition products, and/or be sufficiently thermally conductive. The decomposition unit 104 may include a plurality of collinear bore diameters as shown in FIGS. 2A and 2B without departing from the scope of this disclosure. Proper selection of the length of the heated area (or reaction zone), the inner diameter and the water vapor flow rate, and the length of the unheated "exit" region may allow for a single bore, which may be easier and/or less expensive to manufacture. Depositing materials inside the heated region of the decomposition unit to enhance surface area and heating efficiency may also be useful in the single bore configuration.

FIG. 2C is a cross-sectional diagram along the line A'-A of the decomposition unit 104. In particular, the unit 104 includes an outer coating 202 and a tubing 204 that forms a conduit for passing fluid. In the illustrated implementation, the tubing 204 forms a first area 218 that spans a first length and a second area 220 that spans a second length. The second area 220 may be smaller than the first area 218 and, as fluid passes from the area 220 to 218, the fluid flow rate may increase through the conduit.

Figures 3, 6:
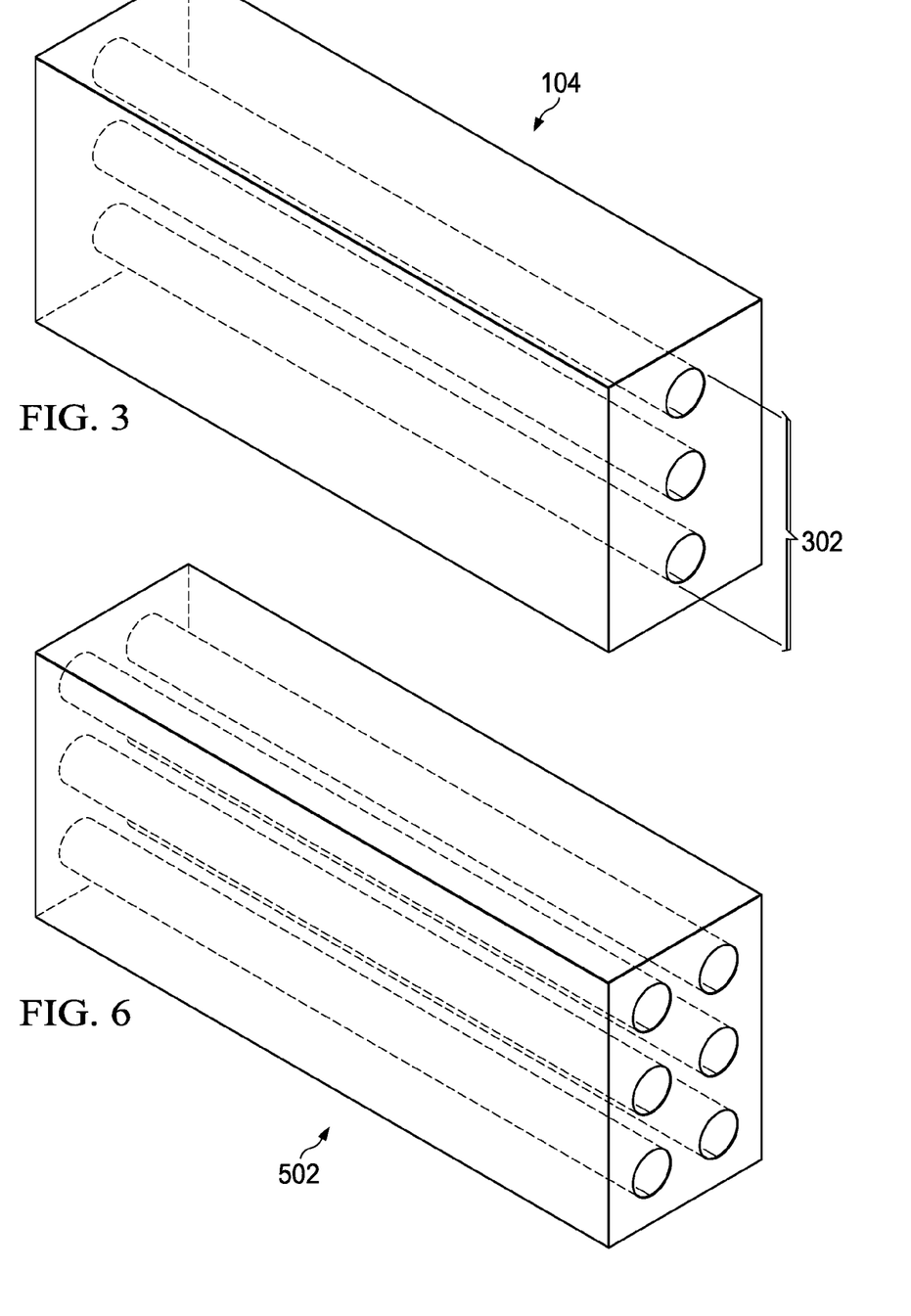
FIG. 3 is another example of the decomposition unit of FIG. 1.
FIG. 6 is another example recompression unit.

FIG. 3 illustrates an example of the decomposition unit 104 that is a plate, in comparison with a tube, where the plate has a plurality of channels 302 for disassociating the water. Once the hot products exit the decomposition unit 104, the ionized gas is rapidly cooled to reduce recombination into water. This "flash cooling" can be accomplished in a number of ways such as, for example, contacting the superheated gas with a cooled gas, liquid, and/or solid.

Figure 4A:
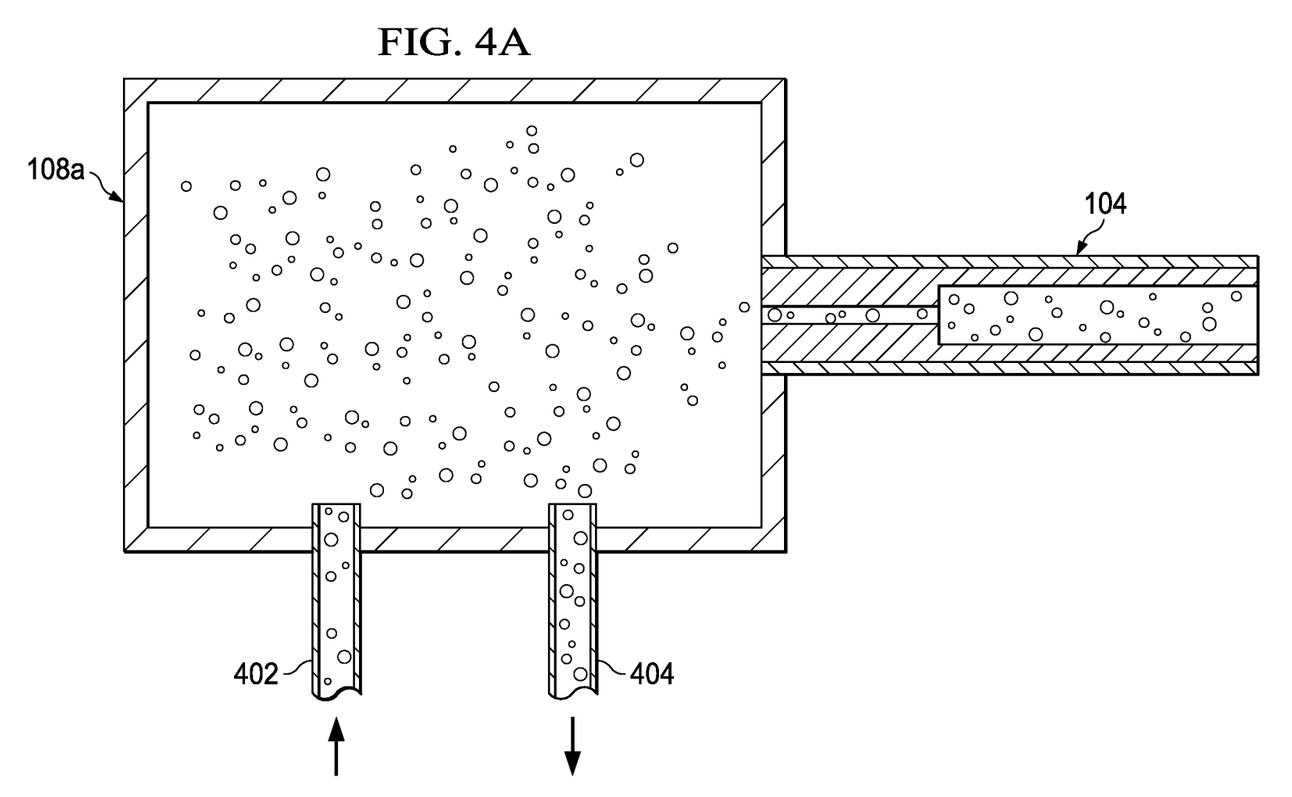
FIGS. 4A-C are examples of cooling units of the system of FIG. 1.
Figure 4B:
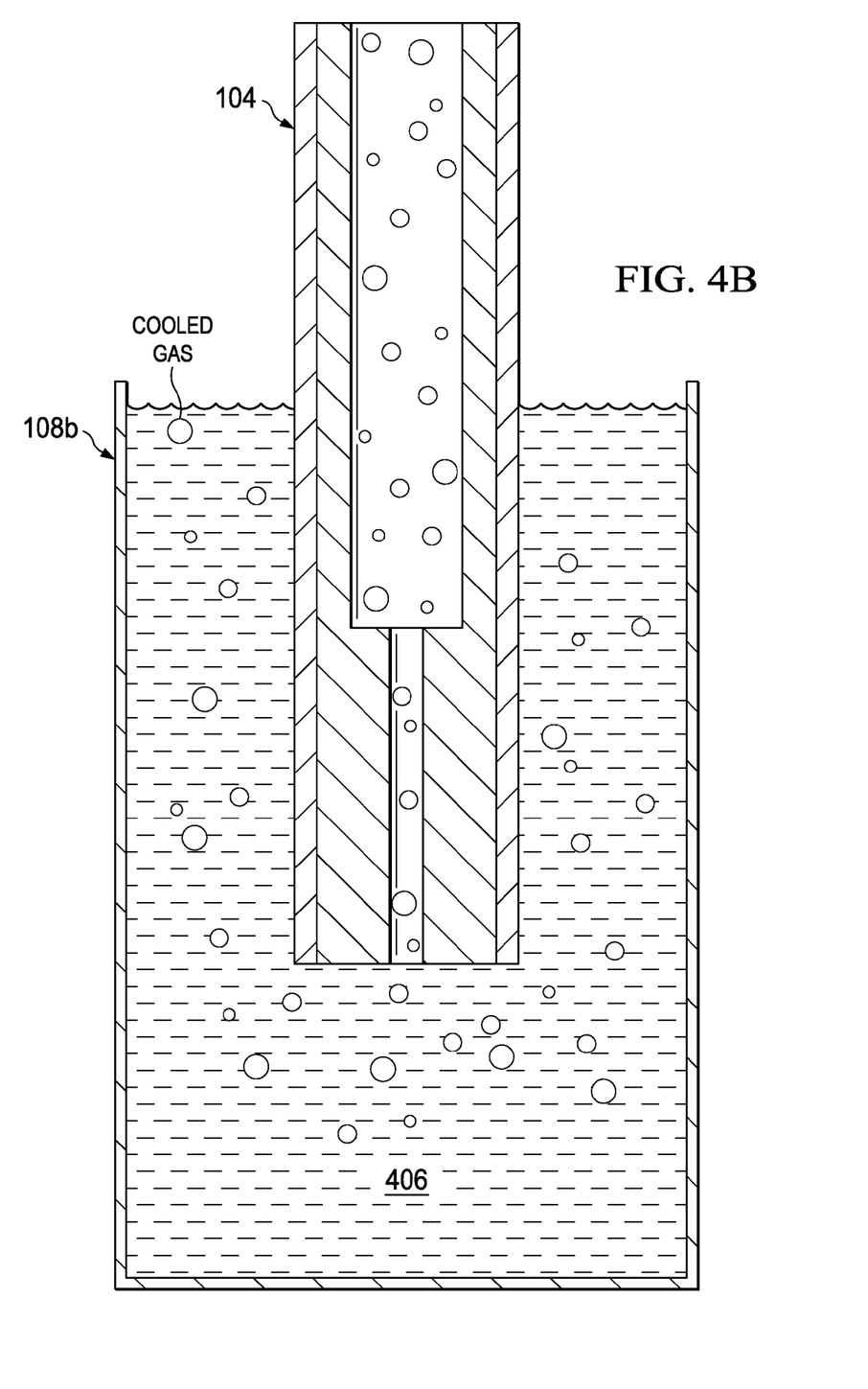
Figure 4C:
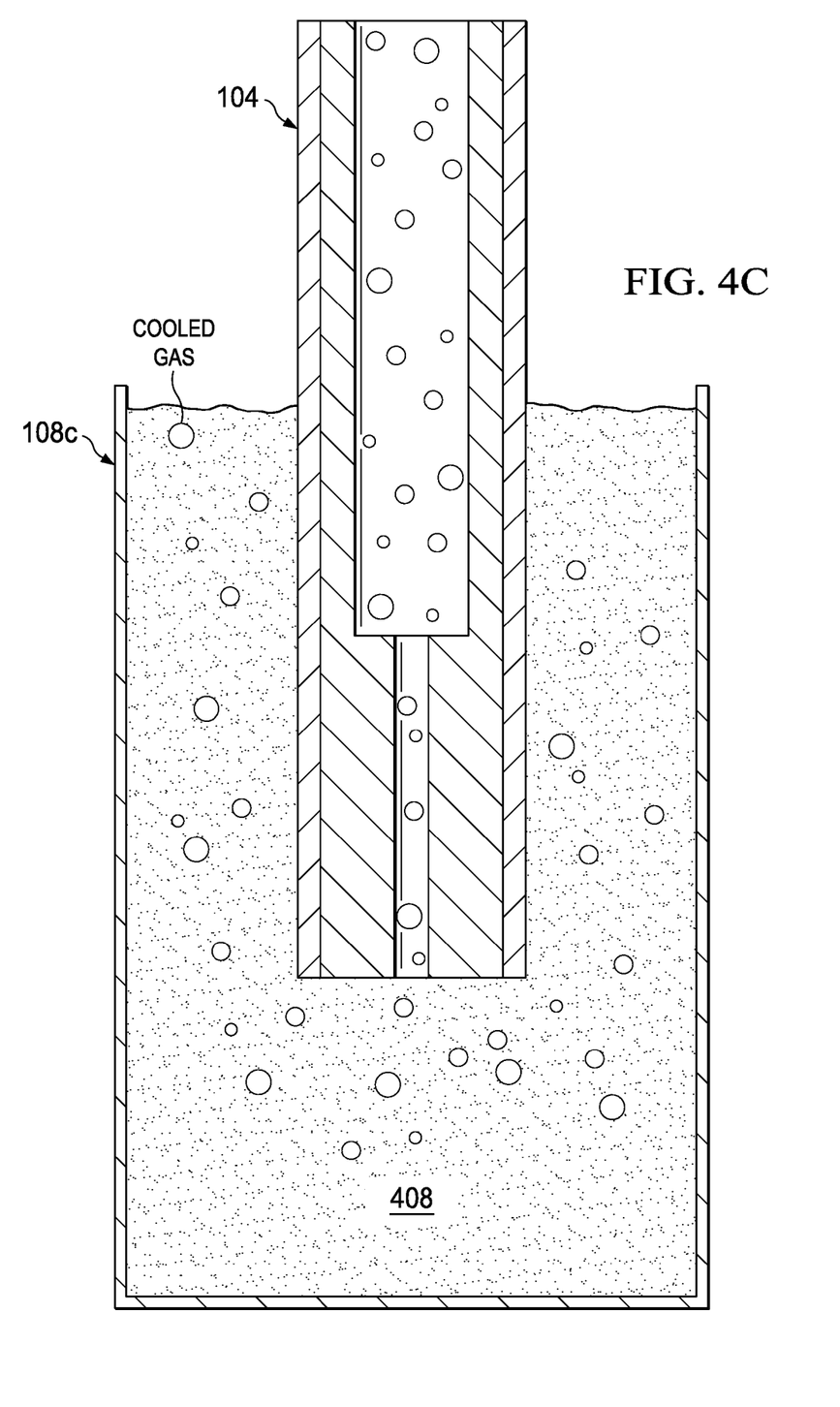

FIGS. 4A-C illustrate example flash cooling units 108 of FIG. 1 using different mediums for transferring heat from the disassociated gas. Referring to FIG. 4A, the decomposition unit 104 ejects the hot gas into the illustrated cooling unit 108a that is filled with cool gas 402 (e.g., approximately 50° C.). The hot gas is rapidly cooled by transferring heat to the cool gas 402 during collisions. The cool gas 402 may be water vapor, Argon, and/or other suitable gas. Referring to FIG. 4B, the cooling unit 108b rapidly bubbles the gas through a cooled liquid 406. In this implementation, the cooled liquids 406 may have high boiling points and/or low vapor pressure at the target cooling temperatures in order to enable the decomposition to take place at a low pressure that may be useful for increasing the amount of decomposition products formed. For example, the cooled liquid 406 may include some silicone oils and/or perfluorinated poly ethers, which are commonly used in diffusion pumps, are relatively unreactive and have very low vapor pressures such as 0.1 Torr to 1 Torr at 200 C. In some implementations, the cooling unit 108b may include a stirrer (not illustrated) to help with thermal transport. Referring to FIG. 4C, the cooling unit 108c includes a dry matrix 408, such as a granular material with high thermal conductivity, which does not react with hot $H_2$ and $O_2$. For example, the granules 408 may be an oxide-based ceramic in a granular form. In some implementations, the cooling unit 108b may include a stirrer (not illustrated) to help with thermal transport.

The cooling unit 108 may include a combination of cool elements, such as a combination of liquids and solids. In addition, the cooling unit 108 may include a heat exchanger system to transfer the heat from the reaction products and the unreacted water to the water reservoir before entering the decomposition unit 104.

Once the decomposition products are cooled, the separation unit 114 separates the hydrogen and the oxygen. In some implementations, the separation unit 114 includes polymeric membranes that are capable of separating hydrogen from oxygen based on the different sizes of the molecules. The efficiency for these membranes may be based on the pressure ratio between the feed side and the permeate side of the membrane. If the decomposition products are created and cooled at a low pressure such as 10 Torr or 100 Torr, the separation unit 114 may recompress the hydrogen gas and the oxygen gas prior to separation to increase separation speed.

Figure 5:
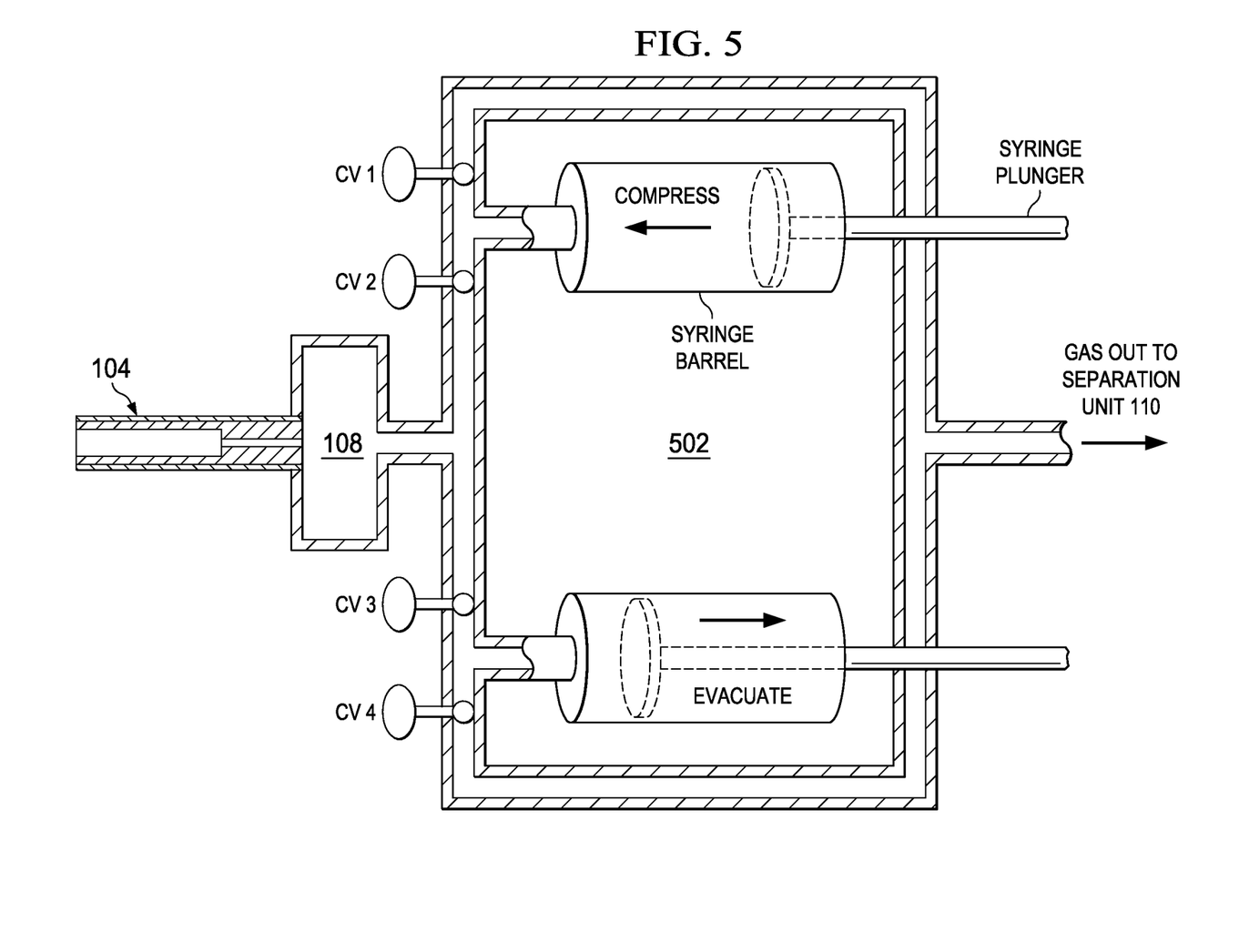
FIG. 5 is an example recompression unit.

FIG. 5 illustrates an example combination vacuum unit and repressurization unit 502 for creating a low pressure in the decomposition unit 104 and recompressing the hydrogen and oxygen prior to separation. In some implementations, the repressurization unit can recompress the gases to approximately between 1 and 10 atmospheres, which may be an appropriate feed side pressure for some polymeric membranes and/or other separation methods. The recompression unit 502 includes an assembly of pistons and valves to alternately pull a vacuum on the decomposition unit 104 and then compress the extracted gas mixture after passing through the cooling chamber 108. The recompression unit 502 then passes the recompressed gas into the feed side of the separation chamber 114. This acts in many ways like a dual piston pump in a "push-pull" mode. Another way to achieve a useful permeation rate is to pull a vacuum on the permeate side and then recompress the permeate once the proper hydrogen purity is achieved. Since the mixture of the hydrogen and oxygen may combust, the recompression unit 502 may be designed to avoid or otherwise reduce any ignition sources to avoid recombination, fire or explosion. For example, the illustrated pistons may be made from, for example, plastic or other non-metals to avoid generating a spark during recompression. In addition, the barrel may be a plastic (e.g., acrylic, polycarbonate), glass, and/or ceramic since the gases at this stage may not at elevated temperatures. The plunger may be plastic with a tight sealing rubber or silicone plunger tip, glass, and/or ceramic. In some cases, the pistons may be comprised of ceramics, such as alumina. Another option would be for the piston barrels to be formed in a plate rather than comprising individual barrels or cylinders. In this example, the piston barrels may have both added strength and enhanced space efficiency, as shown in FIG. 6. In some implementations, the recompression unit 502 may minimize, eliminate or otherwise reduce agitation to substantially avoid recombination. Also, the recompression unit 502 may perform compression relatively slowly to allow heat generated to escape through the walls of the system. In addition, the recompression unit 502 may also provide active cooling (not shown) to the compressed gas in order to keep the heat of compression from exceeding the autoignition temperature for this particular gas mixture.

In summary, it may be useful to thermally process water to produce hydrogen and oxygen in the following way:

1. Adjust the water vapor pressure to be significantly below 1 atmosphere.
2. Heat the low pressure water vapor to approximately 2000° C.
3. Rapidly cool the decomposition byproducts to substantially prevent recombination using, for example, a liquid with a low vapor pressure at the operating temperature.
4. Re-pressurize the decomposition product mixture gently to facilitate membrane-based separation and avoid recombination.

Figure 7:
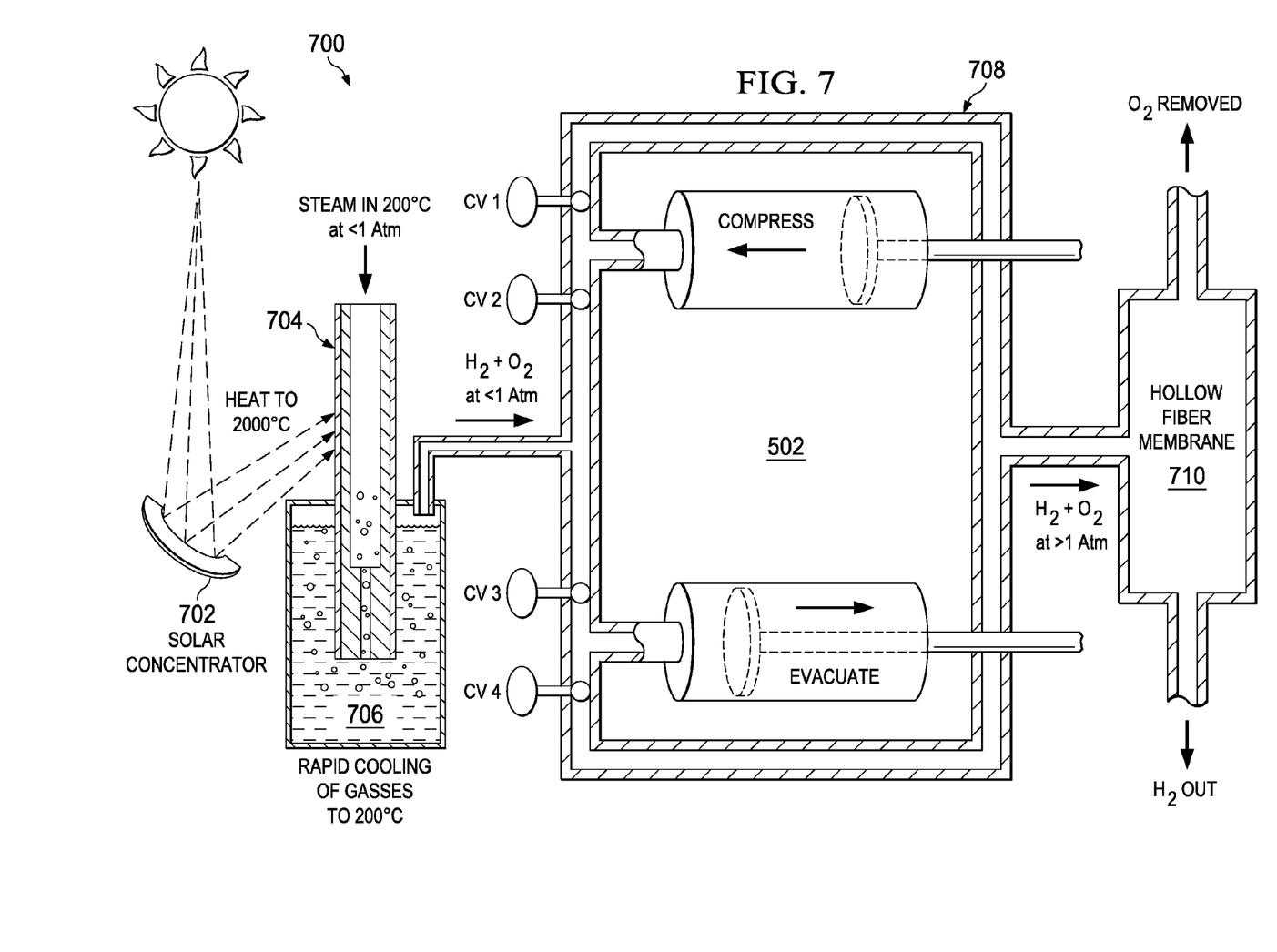
FIG. 7 is an example hydrogen system of FIG. 1.

FIG. 7 illustrates an example hydrogen system 700 for disassociating water using a solar concentrator. As illustrated, the sunlight incident the solar concentrator 702 is focused on the decomposition unit 704. As previously mentioned, the solar concentrator 702 may include a plurality of parabolic mirrors that focus the incident sunlight on an area of the decomposition unit 704. The decomposition unit 704 converts the sunlight to thermal energy to provide sufficient heat to disassociate at least a portion of the water. In some implementations, the decomposition unit 704 may include a first element that absorbs the incident sunlight and converts the absorbed light to heat. The heat may then be transferred by conduction to a second element in contact with water. The heat second element disassociates at least a portion of the surrounding water. After or in connection with the disassociation, the hydrogen and the oxygen gas are injected into the cooling unit 706 for rapid cooling of the mixture. By rapidly cooling the superheated hydrogen and oxygen gas, the cooling unit 706 may reduce the rate of recombination between the hydrogen and the oxygen gas. After sufficiently cooling, the mixture is feed to the pressurization unit 708 to pressurize the mixture in preparation of filtration. In some implementations, the mixture can be pressurized to increase the efficiency of the filtration processes. The pressurized mixture is fed to the filtration unit 710 to remove or otherwise filter the hydrogen from the mixture. In some implementations, the filtration unit 710 includes a membrane that separates or otherwise filters the gases based on size of the molecules.

Figure 8:
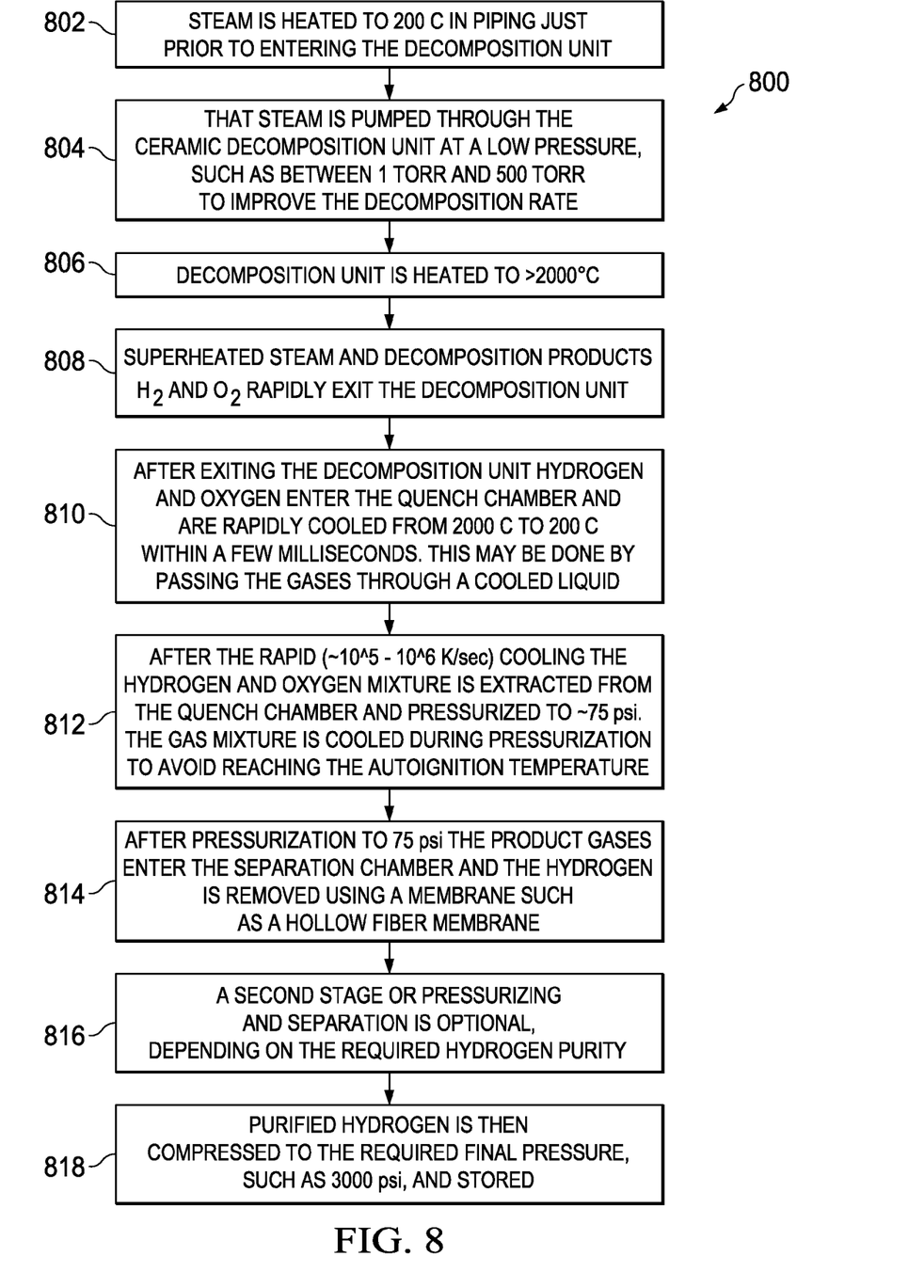
FIG. 8 is a flow chart illustrating an example method for generating hydrogen.

FIG. 8 is a flow chart illustrating an example method 800 for generating hydrogen in accordance with some implementations of the present disclosure. The illustrated methods are described with respect to system 700 of FIG. 7, but this method could be used by any other suitable system. Moreover, the system 700 may use any other suitable techniques for performing these tasks. Thus, many of the steps in this flowchart may take place simultaneously and/or in different orders as shown. System 700 may also use methods with additional steps, fewer steps, and/or different steps, so long as the methods remain appropriate.

Method 800 begins at step 802 where steam is heated to at least about 200° C. in piping prior to entering a decomposition unit. For example, the cooling unit 806 may capture waste heat and transfer the heat to the water reservoir to preheat the water. At step 804, the heated steam is pumped through a ceramic decomposition unit at a low pressure, such as between about 1 Torr and 500 about Torr, to improve the decomposition rate. In the example, the preheated water may be pumped into the bore formed by the decomposition unit 704. Next, at step 806, decomposition unit is heated to at least 2000° C. Again in the example, the interior element of the decomposition unit 704 is heated to about 2000° C. or greater by converting focused sunlight to heat. The superheated steam and decomposition products $H_2$ and $O_2$ rapidly exit the decomposition unit at step 808. At step 810, the hydrogen and oxygen enter are rapidly cooled from 2000 C to 200 C within a few milliseconds. For example, the hydrogen and oxygen may be cooled using a cooled liquid as illustrated in the cooling unit 706. Next, at step 812, the cooled gases are pressurized to ~75 psi after the rapid cooling (~$10^5$ to $10^6$ K/sec). As for the example, the pressurization unit 708 uses pistons to pressurize the gas by compression. In some implementations, the gas mixture can be cooled during pressurization to avoid reaching the autoignition temperature. After pressurization to about 75 psi, the product gases enter, at step 814, a separation chamber to remove the hydrogen using a membrane such as a hollow fiber membrane. In the example, the filtration unit 710 separates the hydrogen and oxygen based on a size-selective membrane. At step 816, the hydrogen mixture is then pressurized and filtered a second time to increase the purity level. Next, at step 818, the purified hydrogen is then compressed for storage and/or transportation. For example, the purified hydrogen may be pressurized to 3000 psi.

What is claimed:

1. An apparatus for the decomposition of water into hydrogen and oxygen, comprising:
    a water vapor source for providing water to an inlet of a ceramic conduit;
    a ceramic element configured to form a conduit that conducts water from the inlet to a reaction zone, decomposes water into hydrogen and oxygen using thermal energy at a reaction pressure, and passes a mixture of the hydrogen and oxygen to a rapid-cooling unit;
    a rapid-cooling unit connected to the ceramic element and containing a cool silicone oil with a vapor pressure lower than the reaction pressure and vapor pressures of the hydrogen and the oxygen, where the cool silicone oil is configured to rapidly cool the mixture of the hydrogen and the oxygen to below an autoignition temperature for the mixture of the hydrogen and the oxygen; and
    a vacuum pump connected to the rapid cooling unit and configured to generate pressure that pulls the mixture of the hydrogen and the oxygen through the cool silicone oil.

2. The apparatus of claim 1, the thermal energy generates a temperature of approximately 2000° C., and the water decomposes at a low pressure in a pressure range from about 5 Torr to 100 Torr.

3. The apparatus of claim 1, the ceramic conduit heated by focused solar radiation.

4. The apparatus of claim 1, the mixture of the hydrogen and the oxygen cooled below the autoignition temperature in less than 10 milliseconds after formation.

5. The apparatus of claim 1, the vapor pressure comprises 0.1 Torr to 1 Torr at 200° C.

6. The apparatus of claim 1, the ceramic element including a light absorbing material configured to generate additional heat for the decomposition of the water.

7. The apparatus of claim 1, further comprising a concentrator that focuses sunlight to about 2000 to 10,000 suns on the reaction zone.

8. The apparatus of claim 1, the ceramic element selectively formed to increase a rate that the hydrogen and the oxygen exit the reaction zone.

9. The apparatus of claim 1, the hydrogen and oxygen exit the reaction zone in about 1 to 10 milliseconds after decomposition.

10. The apparatus of claim 1, a residence time in the ceramic element comprises about 1 to 100 milliseconds.

11. The apparatus of claim 1, further comprising:
    a repressurizing unit configured to repressurize the mixture of the hydrogen and the oxygen after cooling; and
    a membrane configured to separate the hydrogen and the oxygen to form a hydrogen stream and an oxygen stream.

12. The apparatus of claim 11, the repressurizing unit comprising one or more pistons that compress the hydrogen and oxygen to a specified pressure.

13. The apparatus of claim 1, the rapid-cooling unit contains both the cool silicone oil and a cooled solid.

14. The apparatus of claim 1, the rapid-cooling unit further including an element that agitates the cool silicone oil to assist in distributing heat.

15. The apparatus of claim 1, further comprising heat transfer elements selectively positioned in the conduit and configured to increase a rate that heat transfers from the ceramic element to the water.

16. The apparatus of claim 1, further comprising a heat exchanger configured to transfer heat from the rapid-cooling unit to the water vapor source.

17. A system for generating hydrogen, comprising:
    a water vapor source for providing water to an inlet of a ceramic conduit;
    a ceramic element configured to form a conduit that conducts water from the inlet to a reaction zone, convert solar energy to thermal energy to generate a temperature at least about 2000° C., decompose water into hydrogen and oxygen at about 5 Torr to 100 Torr using the thermal energy, and passes a mixture of the hydrogen and the oxygen to a rapid-cooling unit;
    a concentrator that focuses sunlight on the reaction zone to about 2000 to 10,000 suns;
    a rapid-cooling unit connected to the ceramic element and containing cool silicone oil with a vapor pressure lower than vapor pressures of the hydrogen and the oxygen configured to cool the mixture of the hydrogen and the oxygen in less than 10 milliseconds to below an autoignition temperature for the mixture of the hydrogen and the oxygen;
    a vacuum pump connected to the rapid cooling unit and configured to generate pressure that pulls the mixture of the hydrogen and the oxygen through the cool silicone oil;
    a repressurizing unit configured to repressurize the mixture of the hydrogen and the oxygen after cooling; and
    a membrane configured to separate the hydrogen and the oxygen to form a hydrogen stream and an oxygen stream.

* * * * *

UNITED STATES PATENT AND TRADEMARK OFFICE
CERTIFICATE OF CORRECTION

PATENT NO. : 8,815,209 B2
APPLICATION NO. : 12/875648
DATED : August 26, 2014
INVENTOR(S) : Jerry Elkind It is certified that error appears in the above-identified patent and that said Letters Patent is hereby corrected as shown below:

In the Claims

Column 9, Line 30, in Claim 1, delete "where" and insert -- wherein --, therefor.

Signed and Sealed this
Third Day of February, 2015

Michelle K. Lee
*Deputy Director of the United States Patent and Trademark Office*